(12) United States Patent
Minamikawa

(10) Patent No.: US 6,380,970 B1
(45) Date of Patent: Apr. 30, 2002

(54) METHOD AND APPARATUS FOR PRODUCING THREE-DIMENSIONAL IMAGE

(75) Inventor: Yukio Minamikawa, Osaka (JP)

(73) Assignee: Photo Craft Co., Ltd., Osaka (JP)

( * ) Notice: Subject to any disclaimer, the term of this patent is extended or adjusted under 35 U.S.C. 154(b) by 0 days.

(21) Appl. No.: 09/194,883

(22) PCT Filed: Jun. 6, 1997

(86) PCT No.: PCT/JP97/01934

§ 371 Date: Dec. 4, 1998

§ 102(e) Date: Dec. 4, 1998

(87) PCT Pub. No.: WO97/46911

PCT Pub. Date: Dec. 11, 1997

(30) Foreign Application Priority Data

Jun. 7, 1996 (JP) ............................................. 8-146181

(51) Int. Cl.⁷ ........................ H04N 13/02; H04N 15/00
(52) U.S. Cl. ........................................... 348/46; 348/59
(58) Field of Search ............................. 348/46, 42, 43, 348/47, 48, 51, 52, 59, 56, 207, 335; 396/327, 324, 330; 355/22; 359/463; 438/946; H04N 13/02, 15/00

(56) References Cited

U.S. PATENT DOCUMENTS

| 4,364,627 A | * | 12/1982 | Haines ........................ 359/23 |
| 4,757,350 A | * | 7/1988 | Street ........................ 355/22 |
| 5,040,871 A | * | 8/1991 | Davies et al. ................ 297/174 |
| 5,276,478 A | * | 1/1994 | Morton ........................ 355/77 |
| 5,278,608 A | * | 1/1994 | Taylor et al. .................. 355/22 |

FOREIGN PATENT DOCUMENTS

| EP | 0 520 179 A2 | 12/1992 |
| EP | 0 520 179 A3 | 12/1992 |
| EP | 0 590 498 A1 | 4/1994 |
| JP | 6-282019 | 10/1994 |
| JP | 8-9422 | 1/1996 |

\* cited by examiner

*Primary Examiner*—Nhon T Diep
(74) *Attorney, Agent, or Firm*—Morgan, Lewis & Bockius LLP

(57) ABSTRACT

In a case of obtaining a line-shaped image through image processing using a computer, an amount of data to be processed is reduced and a final stereoscopic image is formed by using a usual image. A plurality of two-dimensional images having different parallaxes are converted into line-shaped images, with forming a first image from the line-shaped images in view of projection angles of lenticular lenses, a second image is formed by a usual planar image, and a composite image formed by the first image and the second image is formed on a recording medium disposed beneath the lenticular lenses.

12 Claims, 2 Drawing Sheets

METHOD AND APPARATUS FOR PRODUCING THREE-DIMENSIONAL IMAGE

TECHNICAL FIELD

The present invention relates to a stereoscopic image for obtaining a stereoscopy through lenticular lenses. Particularly, the present invention relates to a stereoscopic image generating method and apparatus using an image processing of a computer.

BACKGROUND ART

A stereoscopic image for obtaining a stereoscopy through lenticular lenses has been known. For example, in the case of generating a stereoscopic photograph, a plurality of two-dimensional images, having different parallaxes, which are obtained at observation points disposed with a constant distance thereamong on a line in parallel to a three-dimensional subject having a depth and extending to the horizontal direction or obtained at observation points disposed with a constant angle thereamong on an arc-shaped curve with respect to the subject, are exposed with different projection angles corresponding to the observation points so as to be imaged on a photosensitive material beneath the lenticular lenses, respectively. The image imaged beneath the lenticular lenses is a line-shaped image which is compressed at the time of passing through lenticular lenses.

When viewing an image imaged beneath the lenticular lenses through the lenticular lenses, the line-shaped image is enlarged and restored through the lenticular lenses. When an operator views the restored image through the lenticular lenses, since there are parallaxes between a pair of images incident into right and left eyes of the operator, these restored images are montaged and then recognized by the operator as a stereoscopy.

When optically obtaining the line-shaped image formed beneath the lenticular lenses by passing through the lenticular lenses, the line-shaped image becomes unclear due to the influence of various kinds of aberrations, and hence the finally obtained stereoscopic image becomes unclear.

Recently, there has been known a means using a computer as a means for forming a clear line-shaped image beneath the lenticular lenses. According to such a means, in order to eliminate the optical aberration causing the aberration, the line-shaped image is obtained not through the lenticular lenses but through the image processing using the computer. Then, the thus obtained line-shaped image is directly formed on a recording medium disposed beneath the lenticular lenses (see Unexamined Japanese Patent Publication No. Hei. 6-309431).

As described above, it is possible to obtain a clear linear-shaped image having no aberration by using a computer. However, in the case of obtaining a line-shaped image through the image processing using the computer, a plurality of image data having different parallaxes are obtained and then these image data is changed into a line-shaped image through the compression processing. Thus, since the data processing of a large amount of image data is required, there arises a problem that it takes a long time for the image processing. Further, since images having different parallaxes are obtained from stereoscopic photographing or the like, the conventional means has a problem that many usual planar images which are on the market now can not be used.

Accordingly, the present invention has been made in view of the aforesaid problem, and hence an object of the present invention is to provide a stereoscopic image generating method and apparatus which is able to reduce an amount of data to be processed and to form a stereoscopic image using a usual image in the case of obtaining a line-shaped image through image processing using a computer.

DISCLOSURE OF THE INVENTION

According to the stereoscopic image generating method according to the present invention, a plurality of two-dimensional images having different parallaxes are converted into line-shaped images, with forming a first image from the line-shaped images in view of projection angles of lenticular lenses, a second image is formed by a usual planar image, and a composite image formed by the first image and the second image is formed on a recording medium disposed beneath the lenticular lenses.

The stereoscopic image generating apparatus according to the present invention comprises means for converting a plurality of two-dimensional images having different parallaxes into line-shaped images, means for mixing in a desired manner a first image formed by the line-shaped images in view of projection angles of lenticular lenses and the second image formed by a usual planar image to thereby form a composite image formed by a stereoscopic image and a planar image, and means for outputting the composite image to a recording medium.

According to the stereoscopic image generating method according to the present invention, the first image formed by line-shaped images for recognizing a stereoscopic image and the second image formed by a usual planar image are mixed to form a composite image on a recording medium, whereby a pseudo stereoscopic image can be recognized. In this manner, since a pseudo stereoscopic image is formed such that a part of an entire image formed on a recording medium is formed by a usual planar image without forming the entire image formed on the recording medium only by the line-shaped images for recognizing the stereoscopic image, the stereoscopic effect can be obtained easily. Further, since a picture image and a character image obtained through the usual photographing can be used as it is as the second image, the composite stereoscopic image can be obtained easily and efficiently.

Further, according to the stereoscopic image generating apparatus according to the present invention, the first image formed by line-shaped images for recognizing a stereoscopic image and the second image formed by a usual planar image are mixed to form a composite image on a recording medium, whereby a pseudo stereoscopic image can be recognized. Since the line-shaped images forming the first image are used to recognize a stereoscopic image, a plurality of images having different parallaxes are subjected to the compression processing and then formed on a recording medium in a deviated state corresponding to projection angles of the lenticular lenses. However, since the usual planar image forming the second image is formed as it is on a recording medium, the compression processing for forming the line-shaped images, the arithmetic operation for obtaining the projection angles of the lenticular lenses or the like can be eliminated. Thus, the load for the image processing can be reduced.

In the present invention, photosensitive material and various kinds of recording papers may be employed as the recording medium disposed beneath the lenticular lenses.

2 is a diagram showing a stereoscopic image generating apparatus according to the present invention.

BEST MODE FOR CARRYING OUT THE INVENTION

Hereinafter, the embodiment of the present invention will be explained with reference to the drawings.

Figure 1:
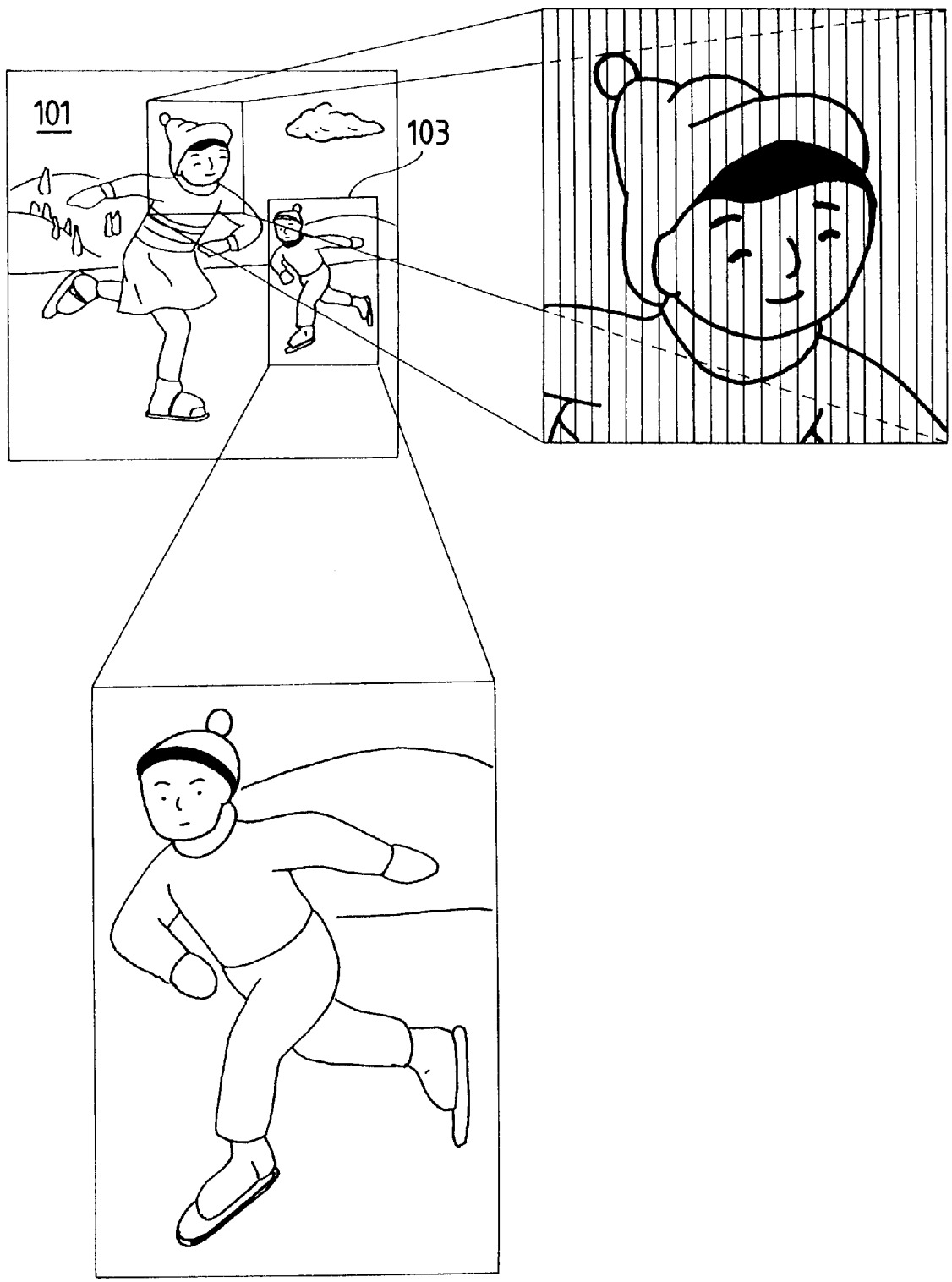
FIG. 1 is a diagram showing a stereoscopic image generating method according to the present invention, and FIG.

FIG. 1 shows a stereoscopic image obtained according to the present invention. That is, an image 101 is formed by line-shaped images which are formed by compressing a plurality of images having different parallaxes obtained through stereoscopic photographing. An image 103 is a so-called usual planar image which can be obtained not through stereoscopic photographing.

As shown in FIG. 1, when viewing through lenticular lenses an image which is formed by the combination of line-shaped images and a usual planar image, the image 101 is recognized as a stereoscopic image when an operator views the image since the plurality of line-shaped images are montaged. When an operator views the image 103, the image is recognized as a planar image since the image is a usual planar image having no parallax. However, when an operator views the entire images, since the planar image is mixed in the stereoscopic images, the entire image is recognized as a pseudo stereoscopic image as if the entire image is a stereoscopic image.

As described above, the entire image can be recognized as a pseudo stereoscopic image even if a usual planar image is mixed in the stereoscopic images. Accordingly, since a usual planar image can be used as a part of the entire image in the case of forming a stereoscopic image, a stereoscopic image can be formed efficiently.

The process for forming such a pseudo stereoscopic image will be explained hereinafter.

First, two-dimensional digital image data for n pieces of images having different parallaxes is obtained through the stereoscopic photographing. The two-dimensional digital image data is compressed to a horizontal direction of the lenticular lenses so as to obtain line-shaped images. In this case, supposing that a width of the image is ΔD, the width of the line-shaped image is defined as ΔD/n. Further, supposing that the unit width of the lenticular lens is W, n line-shaped images each having a width of ΔD/n are formed at every unit width W. When such a process of forming the n line-shaped images is repeated sequentially at every lenticular lens, the line-shaped images for forming the image 101 are formed.

The line-shaped images to be disposed on a recording medium are viewed through the lenticular lenses, so that the projection angle θ for the lenticular lens must be taken into consideration. Accordingly, at the time of disposing the line-shaped images, the line-shaped images are disposed so as to be deviated by an angle of tan e from one another.

Then, a usual planar image such as photographed image or the like is obtained through the usual photographing. The planar image is formed as it is on a desired position of a recording medium without being divided into line-shaped images to thereby form the image 103.

In addition to a photographed image obtained through the usual photographing, a picture, an arbitrarily formed character image, a computer graphic or the like may be used as the usual planar image.

Afterwards, the line-shaped images and the planar image are montaged, then the montaged image is formed on a recording medium disposed beneath the lenticular lenses.

Figure 2:
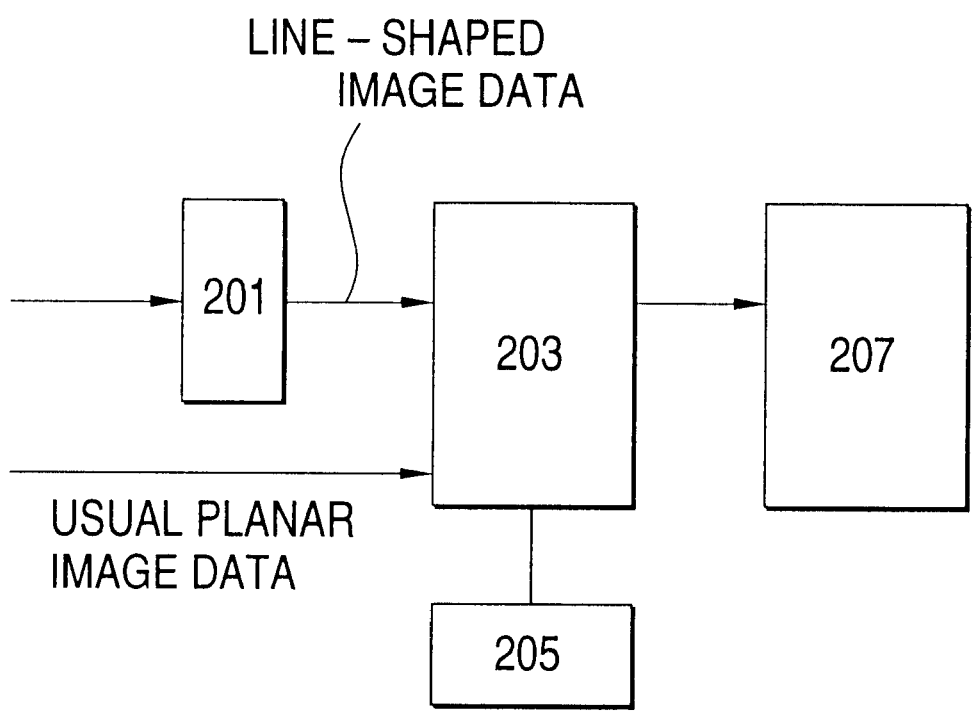

The stereoscopic image generating apparatus according to the present invention will be explained with reference to FIG. 2.

Digital image data, for the plurality of two-dimensional images having different parallaxes obtained through the stereoscopic photographing, is compressed to a direction in parallel to the lenticular lenses by a compression unit 201 to be converted into line-shaped image data and then to be inputted into an image processing unit 203.

The image processing unit 203 forms a composite image in which line-shaped images and a usual planar image are disposed in a mixed manner on the basis of the line-shaped image data and digital image data of the usual planar image obtained through the usual photographing. The line-shaped images and the usual planar image subjected to the mixing processing by the image processing unit 203 are displayed on a monitor 205. An operator operates a key board etc. while monitoring the monitor 205, to thereby perform the mixing processing so that the usual planar image is disposed at a desired position.

The composite image data of the stereoscopic image and the usual planar image obtained by the image processing unit 203 is inputted into a composite image output unit 207. The composite image output unit 207 serves to form the composite image of the stereoscopic image and the usual planar image on a recording medium by scanning operation. It is important to finely reproduce the contour of an image at the time of forming a composite image in order to obtain a clear stereoscopic image. In view of this matter, a laser recording apparatus is preferable as the composite image output unit 207.

The line-shaped images to be formed on a recording medium may be stored in advance as line-shaped image data so that such line-shaped image data is taken into the image processing unit as the need arises. According to such an arrangement, processings such as the stereoscopic photographing, digital compression, arithmetic operation for deviation arrangement or the like can be eliminated. Accordingly, the line-shaped images can be formed quickly on a recording medium. Furthermore, plural kinds of line-shaped image data may be stored in advance, and a desired kind of line-shaped image data may be selected. As described above, according to the stereoscopic image generating method and apparatus according to the present invention, in the case of forming a plurality of line-shaped images having different parallaxes through the image processing using the computer and then forming the line-shaped images on a recording medium disposed beneath the lenticular lenses, a usual planar image obtained through the usual photographing is disposed at a part of an entire image, whereby an amount of image data to be processed can be reduced to a large extent.

Furthermore, since the usual planar image can be used, it is possible to simplify the process for forming a stereoscopic image.

What is claimed is:

1. A stereoscopic image generating method comprising:
   converting a plurality of two-dimensional images having different parallaxes into line-shaped images;
   forming a first image from the line-shaped images in view of projection angles of lenticular lenses;
   forming at least one second planar image; and
   forming a composite image from the first image and the at least one second planar image on a recording medium disposed beneath the lenticular lenses, wherein said composite image comprises a stereoscopic image and the at least one second planar image.

2. A stereoscopic image generating apparatus comprising:

means for converting a plurality of two-dimensional images having different parallaxes into line-shaped images;

means for mixing in a desired manner a first image formed by the line-shaped images in view of projection angles of lenticular lenses and at least one second planar image to thereby form a composite image comprising a stereoscopic image and the at least one planar image; and means for outputting the composite image to a recording medium.

3. The method according to claim 1, wherein said step of forming at least one second planar image includes forming the second planar image without combining a plurality of line-shaped images.

4. The method according to claim 1, wherein the at least one second planar image may include a picture, one or more of a character, or a computer graphic.

5. The method according to claim 1, wherein said step of forming a composite image from the first image and the at least one second planar image includes placing the second planar image at a desired position within the composite image.

6. The method according to claim 1, wherein said step of forming a composite image from the first image and the at least one second planar image includes forming the composite image such that a part of the composite image corresponding to the at least one second planar image is not formed from a plurality of line-shaped images.

7. The method according to claim 1, wherein the recording medium includes photosensitive material.

8. The stereoscopic image generating apparatus according to claim 2, wherein the at least one second planar image is formed without combining a plurality of line-shaped images.

9. The stereoscopic image generating apparatus according to claim 2, wherein the at least one second planar image may include a picture, one or more of a character, or a computer graphic.

10. The stereoscopic image generating apparatus according to claim 2, wherein the means for mixing in a desired manner the first image and the at least one second planar image to thereby form a composite image includes means for placing the at least one second planar image at a desired position within the composite image.

11. The stereoscopic image generating apparatus according to claim 2, wherein the means for mixing in a desired manner the first image and the at least one second planar image to thereby form a composite image includes means for forming the composite image such that a part of the composite image corresponding to the at least one second planar image is not formed from a plurality of line-shaped images.

12. The stereoscopic image generating apparatus according to claim 2, wherein the recording medium includes photosensitive material.

\* \* \* \* \*